(12) United States Patent
Schnitzer

(10) Patent No.: US 7,942,252 B2
(45) Date of Patent: May 17, 2011

(54) GEAR SHIFT MODULE FOR AN AUTOMATIC TRANSMISSION OF A MOTOR VEHICLE

(75) Inventor: Detlef Schnitzer, Denkendorf (DE)

(73) Assignee: Daimler AG, Stuttgart (DE)

( * ) Notice: Subject to any disclaimer, the term of this patent is extended or adjusted under 35 U.S.C. 154(b) by 685 days.

(21) Appl. No.: 11/973,358

(22) Filed: Oct. 4, 2007

(65) Prior Publication Data

US 2008/0067022 A1    Mar. 20, 2008

Related U.S. Application Data

(63) Continuation-in-part of application No. PCT/EP2006/061213, filed on Mar. 31, 2006.

(30) Foreign Application Priority Data

Apr. 5, 2005   (DE) .................. 10 2005 015 482

(51) Int. Cl.
*F16H 61/30* (2006.01)
*F16H 63/30* (2006.01)
*F16D 25/08* (2006.01)

(52) U.S. Cl. ......... 192/3.58; 192/3.61; 192/221; 74/335
(58) Field of Classification Search ............... 192/3.58, 192/3.61, 218; 74/346
See application file for complete search history.

(56) References Cited

U.S. PATENT DOCUMENTS

| 3,103,826 | A | * | 9/1963 | Jaeschke | 74/339 |
| 3,945,265 | A | * | 3/1976 | Bell et al. | 74/335 |
| 4,625,840 | A |   | 12/1986 | Kojima et al. | |
| 4,867,291 | A | * | 9/1989 | Holman et al. | 192/219.3 |
| 7,475,610 | B2 | * | 1/2009 | Bader | 74/333 |
| 2003/0010590 | A1 | | 1/2003 | Hardtle | |
| 2006/0005647 | A1 | * | 1/2006 | Braford et al. | 74/335 |
| 2008/0070749 | A1 | * | 3/2008 | Schnitzer | 477/117 |

FOREIGN PATENT DOCUMENTS

| DE | 697 11 286 | 3/2002 |
| EP | 0 802 356 | 10/1997 |
| GB | 681289 | 10/1952 |
| GB | 1 061 175 | 3/1967 |
| GB | 2 179 712 | 3/1987 |
| WO | WO 2005/037590 | 4/2005 |

* cited by examiner

*Primary Examiner* — Richard M. Lorence
(74) *Attorney, Agent, or Firm* — Klaus J. Bach

(57) ABSTRACT

In a gear shift module for an automatic transmission of a motor vehicle including a series of gear shift elements for example in the form of gear shift forks, which are operated for the shifting of gears, a gear shift module is provided which has a module baseplate forming part of the cylinders of piston-cylinder units and at least part of a housing of a countershaft brake and a central clutch disengager of a starting clutch. These parts can be manufactured jointly providing for lower manufacturing and assembly costs.

7 Claims, 3 Drawing Sheets

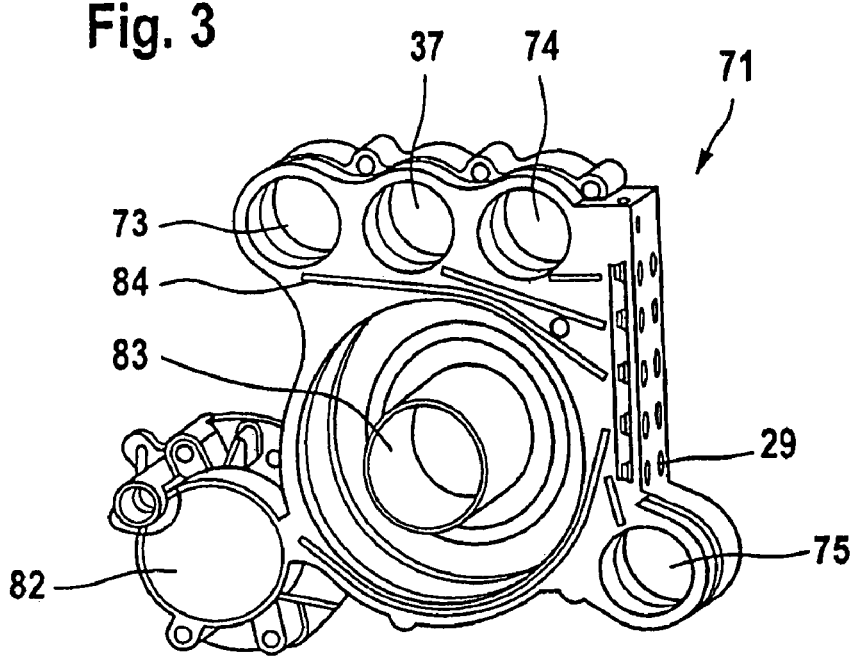
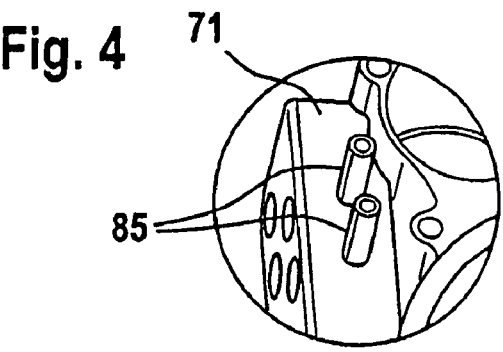
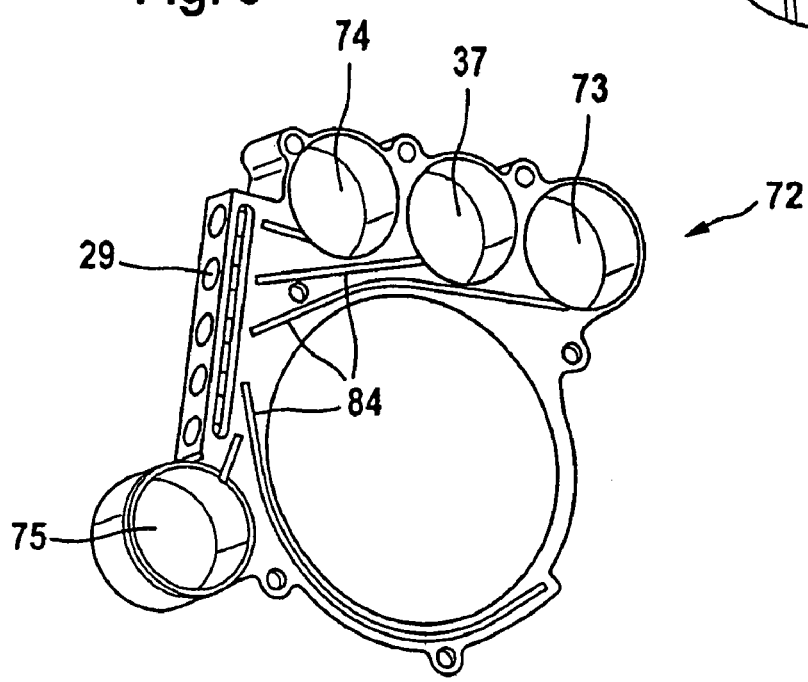

GEAR SHIFT MODULE FOR AN AUTOMATIC TRANSMISSION OF A MOTOR VEHICLE

This is a continuation-in-part application of pending international patent application PCT/EP2006/061213 filed Mar. 31, 2006 and claiming the priority of German patent application 10 2005 015 482.4 filed Apr. 5, 2005.

BACKGROUND OF THE INVENTION

The invention relates to a gear shift module for an automatic transmission of a motor vehicle wherein gear shift elements are activated by hydraulic cylinders.

DE 697 11 286 T2 describes a gear shift device for a transmission of a motor vehicle in which gear shift elements of an auxiliary group of the transmission can be actuated by means of electromagnetically activated valves in the form of solenoid valves. A gear shift element is activated by a gear shift rod which is connected to a piston of a piston cylinder unit. A solenoid valve can move the piston and thus the gear shift rod by feeding in fluid in the form of compressed air into the piston cylinder unit or discharging it from said piston cylinder unit. The gear shift device has a gear shift module which comprises a plurality of piston cylinder units. A main transmission is shifted by means of a gear shift lever which can be operated by the driver of the vehicle.

It is the object of the present invention to provide a gear shift module which results in a cost effective design of a gear shift device for an automatic transmission of a motor vehicle.

SUMMARY OF THE INVENTION

In a gear shift module for an automatic transmission of a motor vehicle including a series of gear shift elements for example in the form of gear shift forks, which are operated for the shifting of gears, a gear shift module is provided which has a module baseplate forming part of the cylinders of piston-cylinder units and at least part of a housing of a countershaft brake and a central clutch disengager of a starting clutch. These parts can be manufactured jointly providing for lower manufacturing and assembly costs.

According to the invention, the gear shift module has a module baseplate which forms part of the cylinders of the piston cylinder units and at least part of a housing of a countershaft brake and/or part of a central clutch disengager of a starting clutch.

The module baseplate, which can be manufactured as a cast part, for example from aluminum, therefore also forms part of the countershaft brake and of the central clutch disengager. These parts do not have to be fabricated separately, which would entail higher costs. Furthermore, this results in a low number of different components of the gear shift device, which simplifies the assembly of the gear shift device and keeps the costs for storing the components low.

The countershaft brake can be used to brake a countershaft of the transmission during up-shifting operations. The countershaft brake is also operated with the operating fluid by means of which the piston cylinder units which are assigned to the gear shift elements of the transmission can also be operated.

The starting clutch is arranged in particular between an engine and the transmission and is embodied as an automatic friction clutch. The central clutch disengager of the clutch is likewise operated by means of the aforesaid operating fluid. The module baseplate forms, in particular, part of a carrier body of the central clutch disengager. An annular piston of the clutch disengager is conveyed on the carrier body when the clutch opens and closes. The design and the mode of operation of a central clutch disengager are described in detail in DE 100 49 459 A1, the contents of which are herewith incorporated by reference into the disclosure of the present application.

In one embodiment of the invention, the gear shift module and the starting clutch are arranged in a front housing part and a main transmission of the automatic speed change gear mechanism is arranged in a central housing part which adjoins the front housing part. The front housing part is connected to the engine of the motor vehicle "at the front" into be understood as in the direction toward the engine. The transmission can have what is referred to as a rear-mounted group which is arranged downstream of the main transmission. In this case, the transmission can additionally have a rear housing part. The rear-mounted group can be embodied, for example, as a range group.

The abovementioned division of the gear shift module, of the starting clutch and of the main transmission into the different housing parts permits particularly simple and thus cost effective assembly of the transmission.

In one embodiment of the invention, the gear shift module has a module cover. The module base plate, the module cover and the front housing part form the cylinders of the piston cylinder units. The construction of the cylinders from three parts permits simple assembly of the piston cylinder units.

In a particular embodiment of the invention, the piston cylinder units are embodied as symmetrical three position cylinders. A symmetrical three position cylinder has two hollow pistons which are guided in a cylinder and one inner piston which is arranged in the hollow piston. The inner piston is connected, for example, to a gear shift rod of the transmission via a piston rod. In a symmetrical three position cylinder, three stable positions can be established. The inner piston can be moved into two outer positions and into one central position. For the purpose of actuation, two ports are necessary for the admission or release of the operating fluid, for example compressed air, on opposite sides of the pistons. The effective piston faces are of the same size for both actuation directions so that, when a fluid pressure is available, an equally high activation force is produced in both actuation directions. When the central position is selected, the effective area composed of the piston faces of a hollow piston and of the inner piston are combined. In contrast, when one of the outer positions is selected the effective area is composed only of the piston face of the inner piston. As a result, a higher operating force can be used for the selection of the central position than in order to adopt an outer position. When the gear shift module is used in an asynchronized speed changing gear mechanism the selection of the central position corresponds to the disengagement of a gear. For this purpose, depending on the operating conditions of the transmission a high force may be necessary. Using symmetrical three position cylinders therefore makes possible a gear shift module which can be used particularly advantageously in asynchronized speed changing gear mechanisms.

In one embodiment of the invention, the module baseplate and/or the module cover have ducts for distributing the operating fluid. The ducts form a connection between a port, to which the operating fluid is fed, and supply lines from valves which can be operated electromagnetically. The module baseplate and/or the module cover have, in particular, recesses for partially accommodating valves by which operating fluid can be fed to and discharged from the piston cylinder units and/or the central clutch disengager and/or the countershaft brake. The aforesaid ducts connect user ports of the valves to the piston cylinder units, the clutch disengager and the countershaft brake. The ducts can be formed during manufacturing, for example during casting, the module baseplate and/or the module cover. As a result, no separate pressure lines are necessary. The arrangement of the valves in recesses in the module baseplate and/or the module cover provides for a particularly compact design of the gear shift device.

Preferably, the module baseplate and/or the module cover have a recess for partially accommodating one or more valves by means of which operating fluid can be fed to, and/or discharged from, a piston cylinder unit which is arranged spaced apart from the gear shift module. This permits all the valves at the gear shift module to be combined even if not all the piston cylinder units of the gear shift device are combined in the gear shift module. No additional cabling of coils for activating the valves is therefore necessary.

The gear shift module has, in particular, a port for a fluid line which is connected to the recess for the valve of the piston cylinder unit which is arranged spaced apart from the gear shift module. Via this port it is possible to connect a user port of the aforesaid valve to the piston cylinder unit.

As described above, the transmission can have, for example, a rear-mounted group which is arranged after the main transmission. A piston cylinder unit for activating gear shift elements of the rear-mounted group can be arranged inside the housing of the rear-mounted group.

The part of the valves which is not accommodated in the recesses of the module baseplate and/or the module cover is arranged, in particular, inside a control device which is mounted on the gear shift module. The control device comprises, in particular, the coils for electromagnetically activating the valves. The coils are in particular arranged together on a circuit board on which all the further electronic components such as the processor and storage modules of the control device can also be arranged. The expenditure for electrically connecting the coils is therefore very low.

The invention will become more readily apparent from the following description of an exemplary embodiment of the invention illustrated in a simplified form in the drawings and explained in more detail in the following description:

BRIEF DESCRIPTION OF THE DRAWINGS

FIG. 3 shows a module baseplate of a gear shift module of the gear shift device, FIG. 4 shows a compressed air port of the module baseplate, FIG. 5 shows a module cover of the gear shift module.

DESCRIPTION OF A PARTICULAR EMBODIMENT

Figure 1:
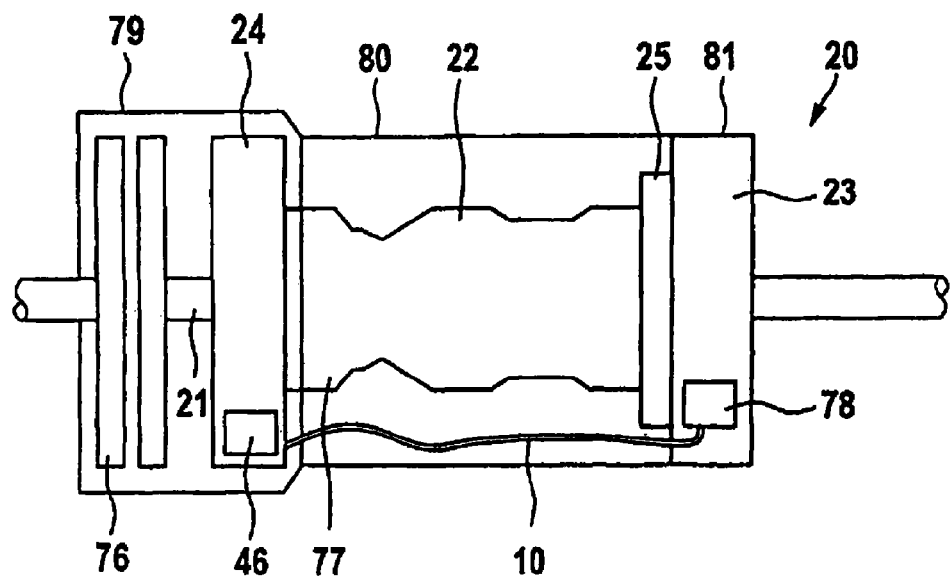
FIG. 1 is a schematic illustration of an automatic transmission.

As shown in FIG. 1, an automatic transmission 20, which is embodied as a gear wheel speed-changing transmission of a countershaft design, has a transmission input shaft 21 which is connected to an engine (not illustrated) by means of an automatic starting clutch 76. The transmission 20 has a split group 77, a main transmission 22 and a group transmission 23 in the form of a range change group which is connected downstream. Gear shift elements of the main transmission 22 and of the split group 77 which are not illustrated in FIG. 1 are activated by piston cylinder units (not illustrated) which are combined in a gear shift module 24. The gear shift module 24 is arranged between the starting clutch 76 and split group 77. A gear shift element (not illustrated) of the group transmission 23 is activated by a piston cylinder unit 78, which is arranged within the group transmission 23. A sensor module 25 is arranged between the main transmission 22 and the group transmission 23. The sensor module 25 has sensors (not illustrated) by means of which rotational speeds of the transmission 20 and positions of the gear shift elements can be sensed. Furthermore, the sensor module 25 has an evaluation module which is not illustrated and which preprocesses the sensed sensor signals and transmits them to a control device 46 of the transmission 20. The control device 46 is arranged on the gear shift module 24, as are all the valves for operating the piston cylinder units.

The gear shift module 24 is connected via a connecting line 10 to the sensor module 25 and the group transmission 23. The connecting line 10 has, for this purpose, fluid lines and electrical lines. The sensor module 25 is supplied with voltage via some of the electrical lines. The evaluation module sends the preprocessed sensor signals to the control device 46 via further electrical lines. This may be done, for example, by means of a CAN protocol which is known per se. Valves which are assigned to the group transmission 23 and which are also arranged in the gear shift module 24 are connected to the piston cylinder unit 78 in the rear-mounted group 23 by means of the fluid lines.

The various elements of the transmission 20 are arranged in three housing parts which together form a housing of the transmission 20. The starting clutch 76 and the gear shift module 24 are arranged in a front housing part 79 which is connected to the engine. The front housing part 79 is adjoined by a central housing part 80 in which the split group 77, the main transmission 22 and the sensor module 25 are arranged. The housing of the transmission 20 is closed off by a rear housing part 81 which includes the group transmission 23 which is connected downstream.

Figure 2:
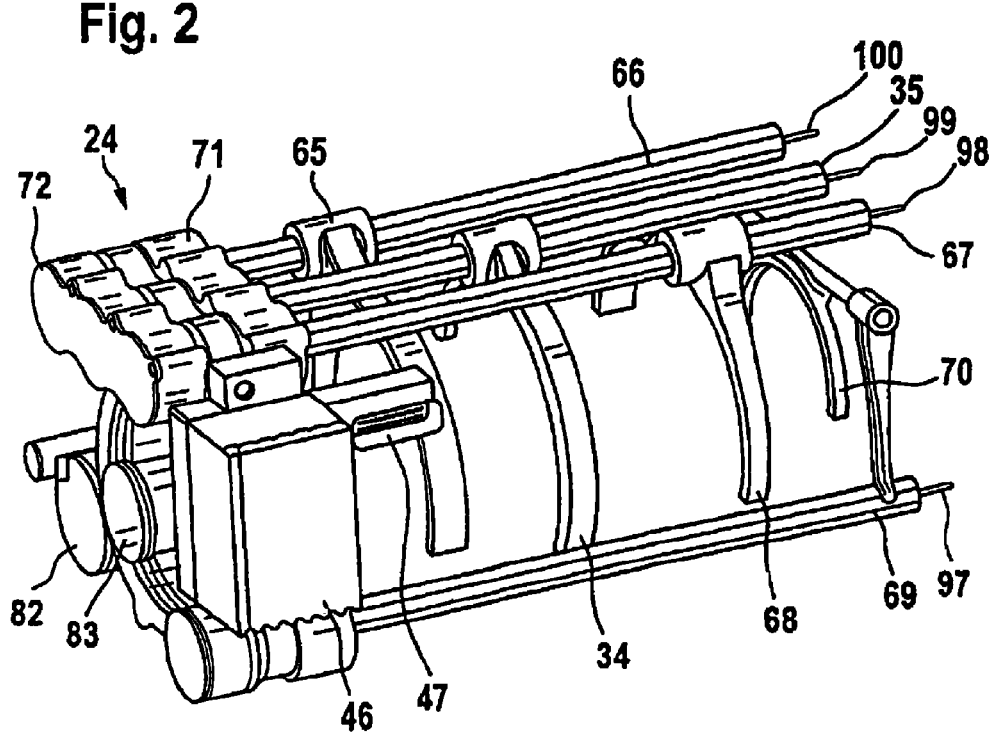
FIG. 2 shows a gear shift device of an automatic transmission.

According to FIG. 2, gear shift elements of the automatic transmission 20 in the form of gear shift forks 34, 65, 68 and 70 are connected to gear shift rods 35, 66, 67 and 69. When the gear shift rods 35, 66, 67 and 69 move, the gear shift forks 34, 65, 68 and 70 are also moved. The gear shift fork 65 can be used to shift the split group 77, forward gearspeeds of the main transmission 22 with the gear shift forks 34 and 68, and a reverse gearspeed of the main transmission 22 with the gear shift fork 70.

The gear shift rods 35, 66, 67 and 69 are connected to pistons of piston cylinder units (not illustrated in FIG. 2) so that a movement of the pistons is transmitted to the gear shift rods 35, 66, 67 and 69 and thus to the gear shift forks 34, 65, 68 and 70. The piston cylinder units are arranged in a gear shift module 24 which has a module baseplate 71 and a module cover 72.

The electronic control device 46 is arranged on the gear shift module 24, which control device 46 can be supplied with voltage via a transmission plug 47 and connected to other control devices of the motor vehicle.

The gear shift rods 35, 66, 67 and 69 have sensor pins 99, 100, 98 and 97 at their end facing away from the gear shift module. The sensor pins 99, 100, 98 and 97 are embodied as thin pins which run coaxially with respect to the gear shift rods 35, 66, 67 and 69. The sensor pins 99, 100, 98 and 97 dip into sensors that are not illustrated, into what are referred to as sensor coils, which are arranged on the sensor module 25. It is thus possible to measure the position of the gear shift rods 35, 66, 67 and 69.

According to FIG. 3, the module base body 71 of the gear shift module 24 forms part of the cylinders of the piston cylinder units 37, 73, 74 and 75 which are provided for activating the gear shift rods 35, 66, 67 and 69. The module base body 71 also forms a housing 82 of a countershaft brake and part of a carrier body 83 of a central clutch disengager. The carrier body 83 is in this context essentially in the shape of a hollow cylinder. The countershaft brake and the clutch disengager are also activated by means of compressed air.

The module base body 71 mainly has cylindrical recesses 29 which can partially accommodate electromagnetically activated valves. By means of the valves it is possible to feed compressed air to the piston cylinder units, the clutch disengager and the countershaft brake or to release pressure from them. For this purpose, the module base body 71 contains ducts 84 which connect the piston cylinder units, the countershaft brake and the clutch disengager to the valves which are assigned to them.

The valves for actuating the piston cylinder unit 78 are connected to the piston cylinder unit 78 by means of the fluid lines of the connecting line 10. For this purpose, the module base body 71 has ports 85. The ports 85 are embodied, according to FIG. 4, as short hollow cylinders which are connected to the associated recesses 29.

According to FIG. 5, the module cover 72 of the gear shift module 24 also forms part of the cylinders of the piston cylinder units 37, 73, 74 and 75. Furthermore, the module cover 72 has further, mainly cylindrical recesses 29 which can partially accommodate valves. In order to distribute the compressed air, the module cover also has ducts 84.

The module base body 71 and the module cover 72 are embodied as aluminum cast parts.

Figure 6:
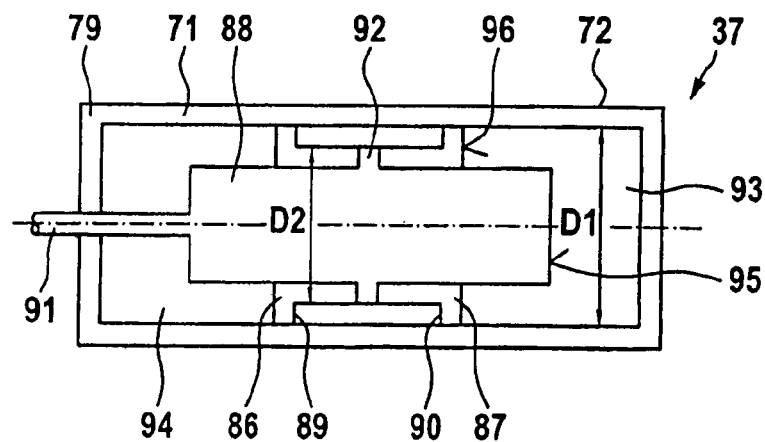
FIG. 6 shows a symmetrical three-position cylinder.

The module cover 72 and the module base body 71 are screwed to the front housing part 79 in the direction of the split group 77 in such a way that together they form the cylinders of the piston cylinder units 37, 73, 74 and 75. The piston cylinder unit 37 is illustrated schematically in FIG. 6 by way of example. Two hollow pistons 86 and 87 are arranged inside the cylinder. The hollow pistons 86 and 87 each have two different diameters D1, D2, and they are arranged here inside the cylinder in such a way that in each case the piston with smaller diameter D2 extends axially inward. The cylinder has diameters which correspond to the diameters D1, D2 of the hollow pistons 86 and 87 so that a stop 90 is provided axially to the left for the right-hand hollow piston 87, and a stop 89 is provided axially to the right for the left-hand hollow piston 86. An internal piston 88, which is permanently connected to a piston rod 91, is displaceably arranged inside the hollow pistons 86 and 87. The piston rod 91 is in turn connected to the gear shift rod 35 so that when the piston 88 is displaced within the cylinder the gear shift rod 35 is also displaced.

The piston 88 has a collar 92 which has a diameter corresponding to the smaller diameter D2 of the hollow pistons 86 and 87. The piston 88 is arranged in such a way that the collar 92 lies between the hollow pistons 86 and 87.

The module cover 72, the piston 88 and the hollow piston 87 form a right-hand pressure chamber 93, and the module body 71, the front housing part 79, the piston 88 and the hollow piston 86 form a left-hand pressure chamber 94. The pressure chambers 93 and 94 are in communication with ducts 84 (not illustrated in FIG. 6) by means of valves which are assigned to them. In the pressure chambers 93 and 94, pressure can therefore be adjusted, that is to say said pressure chambers 93 and 94 can be pressurized or depressurized, that is to say vented.

If the right-hand pressure chamber 93 is pressurized in the illustrated central position of the piston 88, and the left-hand pressure chamber 94 is vented, the piston 88 and the hollow piston 86 are displaced to the left until the piston 88 abuts the front housing part 79. The hollow piston 87 remains in the illustrated position. The force which acts on the piston rod 91 results from the pressure in the pressure chamber 93 and the piston face 95 of the piston 88.

If the piston 88 is then to be moved to the right again, the left-hand pressure chamber 94 is pressurized and the pressure chamber 93 is vented. The piston 88 and the hollow piston 86 therefore move to the right. The hollow piston 86 moves to the right until it abuts against the stop 89 of the cylinder. The piston 88 moves further until the piston face 95 abuts the module cover 72.

The force acting on the piston rod 91 here results for the first part of the movement during which the hollow piston 86 is also moved, the pressure in the pressure chamber 94 and by the sum of the area of the piston face 95 of the piston 88 and of that of the piston face 96 of the hollow piston 86. The force is therefore larger than the force when the piston 88 is pushed out and the hollow piston 87 is stationary. As soon as the hollow piston 86 is stationary, the movement of the piston 88 corresponds to the described movement of the piston to the left. The force therefore also drops.

If the illustrated central position of the piston is to be adjusted, the movement of the piston 88 to the right has to be braked by correctly timed venting of the pressure chamber 93. The central position is held if both pressure chambers 93 and 94 are ventilated.

Since the piston cylinder unit 37 has three stable positions and the force which is applied is equally large in both activation directions, such a piston cylinder unit is referred to as a symmetrical three position cylinder. However, it is also possible to use an asymmetrical three position cylinder in which the forces acting in the two activation directions are different in magnitude.

Figure 7:
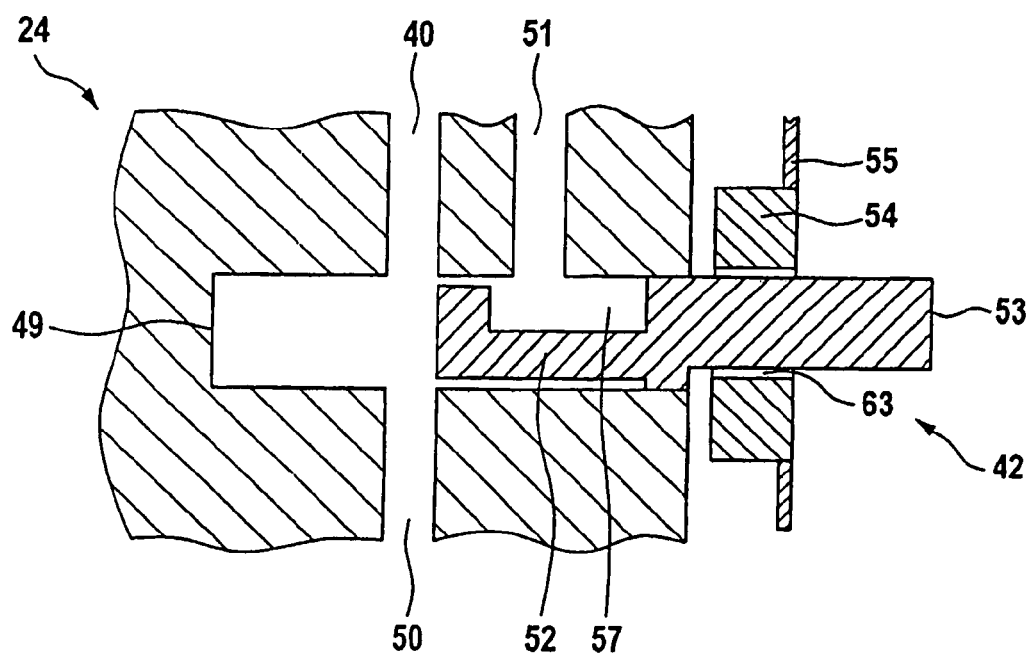
FIG. 7 shows a detail of the gear shift device with an electromagnetically activated valve.

FIG. 7 illustrates the arrangement of a valve 42 in the gear shift module 24 and of the control device 46 by way of example for the arrangement of all the valves. According to FIG. 7, the gear shift module 24 has a mainly cylindrical recess 49 which accommodates part of the valve 42. The gear shift module 24 has a zero outflow 50 to the surroundings, which is arranged aligned with a pressure line 40 which serves as an actuator port of the valve 42. The pressure line 40 is connected via a duct 84 to a pressure chamber of a piston cylinder unit. The pressure line 40 and the zero outflow 50 are separated by the recess 49. Furthermore, the gear shift module 24 has a supply line 51 which is arranged parallel to the pressure line 40 and is connected to a compressed air port. The gear shift device is supplied with compressed air via the compressed air port. The supply line 51 also opens into the recess 49. The valve 42 has a cylindrical piston 52 which can be displaced within the recess 49. The part 53 of the valve 42 which lies opposite the piston 52 is arranged in the control device 46. One section of the part 53 of the valve 42 is surrounded by an electromagnetic coil 54 which is arranged on a circuit board 55 of the control device 46. A cavity 63 which is formed by the coil 54 therefore constitutes a recess in the control device 46 which accommodates part of the valve 42. The piston 52 of the valve 42 can be displaced in the recess 49 of the gear shift module 24 by correspondingly electrically actuating the coil 54. The valve 42 is arranged completely within the control device 46 (not illustrated in FIG. 7).

In the illustrated, completely retracted position of the piston 52, the coil 54 does not have current applied to it. The illustrated position therefore constitutes a position of rest of the valve 42. In this position of rest, the pressure line 40 is connected to the zero outflow 50 via the recess 49. The pressure space 38 of the piston cylinder unit 37 is therefore pressureless. By correspondingly actuating the coil 54 it is possible for the piston 52 to be displaced in the direction of the pressure line 40 to such an extent that the pressure line 40 is closed off from the piston 52. In this position, an instantaneously prevailing pressure in the pressure line 40 is maintained. If the piston 52 is displaced even further by corresponding actuation, the supply line 51 is connected to the pressure line 40 via a recess 57 in the piston 52. In this position, compressed air is fed into the pressure chamber of the piston cylinder unit and the pressure chamber is therefore ventilated.

The gear shift device has a total of 15 valves, with 10 valves being arranged in the module baseplate 71 and 5 valves being arranged in the module cover 72. Each of the 5 piston cylinder units 37, 73, 74, 75, 78 for operating the gear shift rods 35, 66, 67 and 69 and the group transmission 23 has two pressure chambers which are each assigned a valve. 4 valves are necessary to activate the clutch disengager and one valve is necessary for the countershaft brake.

What is claimed is:

1. An automatic transmission (20) of a motor vehicle, comprising a transmission housing (79, 80, 81) including a gear shift module (24) with gear shift elements (34, 65, 68, 70), a plurality of fluid-activated piston cylinder units (37, 73, 74, 75) disposed in the gear shift module (24) for operating the gear shift elements, said gear shift module (24) including a module baseplate (71) forming part of the cylinders of the piston cylinder units (37, 73, 74, 75) and at least part of a housing (82) of a countershaft brake and part of a central clutch disengager (83) of a starting clutch (76), the gear shift module (24) and the starting clutch (76) being arranged in a front housing part (79) and a main transmission (22) of the automatic transmission (20) being arranged in a central housing part (80) which adjoins the front housing part (79), the gear shift module (24) having a module cover (72), the module baseplate (71) and the module cover (72) forming cylinders of the piston cylinder units (37, 73, 74, 75) and being fastened to the front housing part (79).

2. The automatic transmission as claimed in claim 1, wherein the module baseplate (71) is at least part of a carrier body (83) of the central clutch disengager.

3. The automatic transmission as claimed in claims 1, wherein the piston cylinder units (37, 73, 74, 75, 78) are symmetrical three position cylinders.

4. The automatic transmission as claimed in claim 1, wherein at least one of the module baseplate (71) and the module cover (72) include ducts (84) for distributing the operating fluid.

5. The automatic transmission as claimed in claim 1, wherein the module baseplate (71) and/or the module cover (72) have recesses (49) for partially accommodating valves (42) for controlling the supply and discharge of operating fluid to and from at least one of the piston cylinder units (37, 73, 74, 75, 78) and the central clutch disengager and the countershaft brake.

6. The automatic transmission as claimed in claim 5, wherein at least one of the module baseplate (71) and the module cover (72) has a recess (49) for accommodating part of a valve (42) by means of which operating fluid can be fed to, or discharged from, a piston cylinder unit (78) which is arranged spaced apart from the gear shift module (24).

7. The automatic transmission as claimed in claim 6, wherein the gear shift module (24) has a port (85) for a fluid line (10), which port is connected to the recess (49) for the valve (42) of the piston cylinder unit (78) which is arranged spaced apart from the gear shift module (24).

* * * * *